US006664357B1

(12) United States Patent
Edelman

(10) Patent No.: US 6,664,357 B1
(45) Date of Patent: Dec. 16, 2003

(54) METHOD FOR THE PREPARATION OF A STABLE ANAEROBIC/UV/VISIBLE LIGHT CURABLE ADHESIVE

(75) Inventor: Robert Edelman, Staten Island, NY (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 10/348,654

(22) Filed: Jan. 21, 2003

(51) Int. Cl.$^7$ ............................................. C08F 220/12
(52) U.S. Cl. ................ 526/329.6; 526/173; 526/217; 526/222; 526/320; 526/321; 526/323.1; 525/250; 525/257; 525/259; 525/261
(58) Field of Search ............................. 526/320, 321, 526/323.1, 173, 213, 217, 222, 329.6; 525/250, 257, 259, 261

(56) References Cited

U.S. PATENT DOCUMENTS

| 4,235,986 | A | | 11/1980 | Catena |
| 6,231,714 | B1 | * | 5/2001 | Woods et al. ............. 156/275.7 |
| 6,451,948 | B1 | * | 9/2002 | Woods et al. ................ 526/313 |
| 6,460,464 | B1 | | 10/2002 | Attarwala |
| 2002/0111439 | A1 | * | 8/2002 | Attatwala et al. ........... 525/426 |
| 2003/0032736 | A1 | * | 2/2003 | Kneafsey et al. ........... 525/418 |

* cited by examiner

*Primary Examiner*—Helen L. Pezzuto
(74) *Attorney, Agent, or Firm*—Charles W. Almer

(57) ABSTRACT

An improved process for manufacturing a dual cure anaerobic/ultraviolet adhesive. The process includes the first step of mixing a polymerizable (meth)acrylate ester monomer, such as methacrylic acid, a chelating agent and an accelerator. The second step is heating the mixture sufficiently to provide anaerobic curing properties. Next, one or more photoinitiators are added to the composition. No chelating agent is added during the addition of the photoinitiators.

18 Claims, No Drawings

METHOD FOR THE PREPARATION OF A STABLE ANAEROBIC/UV/VISIBLE LIGHT CURABLE ADHESIVE

FIELD OF THE INVENTION

The present invention relates to a method of making a stable anaerobic//UV/visible light curable adhesive that involves the step of the addition of a photoinitiator without a chelator.

BACKGROUND OF THE INVENTION

Anaerobic cure compositions with secondary curing mechanisms, such as ultraviolet/visible light, are well known in the prior art. Such adhesives have a variety of commercial uses. Generally, these adhesives are especially useful for bonding tight-fitting metal parts, ideally 5 mil or less in size, wherein some amount of adhesive will be forced out of the bondline. In such applications, the ultraviolet/visible light is used to cure the portion of the adhesive that is forced out of the bondline. One use of an anaerobic/ultraviolet dual cure adhesive is in the manufacture of ammunition. In particular, such dual cure adhesives are useful in bonding the primer cup in its pocket in the cartridge of center fire ammunition. This bonding is critical in that an improper bonding of the primer cup can result in the introduction of moisture and other foreign materials into the primer cup pocket and cause a misfire of the ammunition. The dual cure nature of the adhesive provides anaerobic curing on the internal portions of the primer cup and ultraviolet/visible light curing on the exposed edges of the primer cup. The ultraviolet/visible light curing also provides the benefit of sealing the area around the perimeter of the primer cup so that moisture can not be introduced into the primer cup pocket. U.S. Pat. No. 6,460,464 further describes the dual cure sealing of ammunition and is incorporated herein in its entirety. Other uses for such a dual cure adhesive include permanently fixing the position of a screw that is set at a particular point. In such applications the adhesive is placed along the threads and over the head of the screw. The anaerobic curing bonds the screw threads in place and the ultraviolet light is utilized to cure the adhesive over the head of the screw to prevent tampering.

Processes for manufacturing single and dual cure adhesives are also well known in the prior art. U.S. Pat. No. 4,235,986 describes a method of manufacturing a stable anaerobic curing adhesive and is incorporated herein in its entirety. A process for manufacturing a dual cure adhesive, wherein one of the curing mechanisms is anaerobic, is needed because of the difficulty in maintaining stability and performance in the anaerobic portion of the adhesive over time.

The reason for this is that anaerobic adhesives are extremely sensitive to the presence of trace transition metals that are found in virtually all materials. The manufacture of anaerobic adhesives thus requires particular procedures (See U.S. Pat. No. 4,235,986) and ingredients such as selected chelating agents, to prevent trace transition metals present in the manufactured adhesive from causing cure to take place in the absence of air before use. Thus, when an adhesive is manufactured it is stable until the time of application when it is brought into contact with metal substrates that will begin the curing process. Therefore it is critical that an anaerobic adhesive not come into contact with any source of transition metals after manufacture and before use. If one wishes to include an additive in the composition, it must be subjected to the manufacturing process in order for the adhesive to have acceptable stability. However, some additives such as photoinitiators are too sensitive to the conditions of the anaerobic manufacturing process and cannot be combined with the other ingredients. These manufacturing conditions may be oxidative and may include exposure to heat or light. If these materials are added to the anaerobic composition after the completion of the anaerobic manufacturing process, the trace metal contamination found in them may render the final product unstable or diminished in performance over time.

Therefore it would be advantageous to provide a manufacturing process for a stable anaerobic//ultraviolet/visible light dual cure adhesive with undiminished anaerobic performance that would allow for the addition of a significant quantity of one or more photoinitiators after the anaerobic manufacturing step is completed.

SUMMARY OF THE INVENTION

The present invention is directed to a process for manufacturing a dual cure anaerobic//ultraviolet/visible light adhesive. The process includes the first step of mixing polymerizable (meth)acrylate ester monomers or oligomeric polymerizable (meth)acrylate esters or both, (meth)acrylic acid, a chelating agent and saccharin and heating them at a specified temperature for a fixed time. The second step involves adding a tertiary amine accelerator, continuing heating of the mixture at the same temperature while rapidly stirring in air over an extended time to provide a stable yet reactive anaerobic composition. Next, after cooling to room temperature, one or more photoinitiators are added to the composition together with an oxidant. Unexpectedly, the final composition is stable, reactive anaerobically over 12 months at room temperature and capable of being cured by ultraviolet/visible light.

DETAILED DESCRIPTION OF THE INVENTION

As set forth above, the dual cure adhesive of the present invention comprises at least one polymerizable (meth)acrylate ester group, including (meth)acrylic acid. One particularly preferred (meth)acrylate is propoxylated(2) neopentyl glycol diacrylate which is commercially available as SR-9003 from Sartomer Inc. Other preferred acrylates include tridecyl acrylate, commercially available as SR489 from Sartomer and isocyanate-hydroxyacrylate or isocyanate-aminoacrylate reaction products that may be characterized as acrylate-terminated polyurethanes and polyureides or polyureas. Other useful monomers include the acrylate diesters of bisphenol-type compounds and monofunctional acrylate and methacrylate esters of the hydroxy-, amido-, cyano-, chloro-, and silane-substituted derivatives thereof. Preferred methacrylates include triethyleneglycol dimethacrylate, tetraethyleneglycol dimethacrylate, polyethyleneglycol dimethacrylate and hydroxyethyl methacrylate. All of the monomers are anaerobically curable monomers having polymerizable (meth)acrylate or substituted (meth)acrylate ester groups as a common, unifying characteristic. Preferably, the monomer comprises no more than in the range of about 75–95% of the total weight of the composition and most preferably no more than in the range of about 80–90% of the total weight of the composition.

A second ingredient in the dual cure adhesive is one or more reaction accelerators. The accelerator preferably includes both an organic cyclic sulfimide and an aromatic tertiary amine. Numerous materials are known in the art to produce an anaerobic cure and these materials may be incorporated into the composition of the present invention. A preferred cyclic sulfimide is o-benzoic sulfimide (saccharin). Preferred aromatic tertiary amines include toluidine, such as N,N-diethyl-p-toluidine, N,N-dimethyl-o-toluidiene, acetyl phenylhydrazine, N,N dimethylaniline, N,N diethylaniline, p-isopropyl-N, N-dimethylaniline, N,N-dimethyl-p-toluidine, 2,4-dimethyl-N,N-dimethylaniline, 3,5-dimethyl-N, N-dimethylaniline and mixtures thereof. The adhesive composition preferably comprises in the range of about 0.01 to about 12 weight percent of the cyclic sulfimide accelerator and in the range of about 0.01 to about 3 weight percent of the aromatic tertiary amine.

A chelating agent is required during certain steps of the process of manufacturing the adhesive composition. The chelating agent is a compound that is capable of complexing a metal atom through coordination bonds between the metal and the electron donating atoms of the chelator to form a stable metal chelate. Although many chelating agents are useful in the composition, the preferred chelators are compounds having a combination of oxygen and nitrogen ligands such as the aminopolycarboxylic acids and their salts such as the tetrasodium salt of ethylenediaminetetraacetic acid (EDTA) or the diammonium salt. The amount of chelating agent necessary is dependent upon the actual chelating agent chosen and the other ingredients of the composition. Generally, in the range of about 0.001 to about 0.2 weight percent of the composition is chelating agent. Preferably, the chelating agent comprises in the range of about 0.005 to about 0.1 weight percent of the composition. A plasticizer or thickening agent may also be added to the composition during the manufacturing process.

Photoinitiators are required in order to provide the requisite ultraviolet/visible light curing capability. Preferred photoinitiators are those commercially available from Ciba-Geigy Corporation under the IRGACURE and DAROCUR tradenames. Specific preferred photoinitiators include IRGACURE 184 (1-hydroxycyclohexyl phenyl ketone); 500 (the combination of the 1-hydroxy cyclohexyl phenyl ketone and benzophenone); 651 (2,2-dimethoxy-2-phenyl acetophenone); 1700 (the combination of bis(2,6-dimethoxybenzoyl-2,4,4-trimethyl pentyl phosphine oxide and 2-hydroxy-2-methyl-1-phenyl-propan-1-one); and DAROCUR 1173 (2-hydroxy-2-methyl-1-phenyl-1-propane) and 4265 (the combination or 2,4,6-trimethylbenzoyldiphenyl-phosphine oxide and 2-hydroxy 2-methyl-i-phenyl-propan-1-one and mixtures thereof. Another preferred photoinitiator is trimethylbenzoylphosphine oxides, commercially available from BASF as LUCIRIN TPO. The photoinitiator comprises in the range of about 0.5 to about 10 weight percent of the adhesive composition and preferably comprises in the range of about 2 to about 8 weight percent of the composition. The photoinitiators or other ingredients such as oxidants, dyes or fluorescent agents are added after the manufacturing process has been completed.

To prepare the adhesive composition, it is first necessary to combine the polymerizable (meth)acrylate ester components with the saccharin and the chelating agent(s) and heat them at elevated temperature for 3–16 hours. The tertiary amine is then added to the mixture in portions and heated to a specified temperature while undergoing vigorous mixing in air. This procedure is continued until the mixture is stable as evidenced by a greater than 2 hour gel time at 80C. The heating temperature is in the range of about 20C to about 100C, with a preferred temperature in the range of about 45C to about 70C. The time required for the heating is dependent upon the materials in the composition, the temperature and the rate of stirring. Generally, the period of heating is in the range of about 4 to about 30 hours and preferably the heating period is in the range of about 10 to about 24 hours. After this time the photoinitiators, oxidants, dye and fluorescent agents are added in at room temperature.

Unexpectedly, it has been found that the addition of a significant quantity of photoinitiators and other additives at the end of the manufacturing process, without the addition of any additional chelating agents, does not affect the stability of the anaerobic portion of the adhesive. The adhesives of the present invention do not have significantly reduced stability or performance even with the addition of >5 weight percent photoinitiators.

The following example is intended to illustrate the invention but is not intended to limit the scope of the invention in any manner.

EXAMPLE

A sample adhesive formulation was prepared having the ingredients set out in Table 1.

TABLE 1

Adhesive Formulation

| Ingredient | Weight Percent |
| --- | --- |
| SR-9003 | 81.9 |
| SR-489 | 4.4 |
| Acrylic Acid (99%) | 1.9 |
| Saccharin | 2.85 |
| EDTA(NH$_4$)$_2$ (5% in 1:1 vol/vol, methanol/water | 1.19 |
| N,N-dimethyl-p-toluidine | 0.95 |
| UVITEX OB | 0.01 |
| LUCIRIN TPO | 1.0 |
| IRGACURE 184 | 5.0 |
| Cumene Hydroperoxide (70%) | 2.0 |
| Yellow Dye | 0.01 |
| Blue Dye | 0.01 |

UVITEX OB is a fluorescent agent commercially available from Ciba Geigy Specialty Products The adhesive was manufactured by first charging the SR-9003, SR-489, acrylic acid, saccharin and EDTA(NH$_4$)$_2$ to a clean polyethylene-lined vessel equipped with a fiberglass stirrer. The composition was heated to a temperature of 67C and held at that temperature for three hours. After three hours, ⅓ of the N,N-dimethyl-p-toluidine was added and the composition was mixed vigorously for one hour. The gel time at 82C is then taken and should always be no less than 5 minutes. If the gel time is less than 2 minutes the reaction should be quenched with 0.02 parts hydroquinone and aborted because the mixture is too unstable and will undergo radical polymerization. The remainder of the N,N-dimethyl-p-toluidine was then added and the composition was mixed vigorously until a gel time of >2 hours at 82C is obtained. At that time, the additional ingredients were added in the order set out in Table 1 and the composition was mixed until uniform.

The properties of the adhesive were evaluated by assembling five steel bolts (⅜"×16) and nuts using the adhesive. The fingertight time, i.e., the time until the nut and bolt could no longer be separated with finger pressure, was obtained in ten minutes. A thin film was placed on a glass slide and conveyed under a Fusion Systems "V" bulb at a speed setting of 2. A tack-free surface was obtained. Five additional nuts and bolts were then assembled as above and the average torque strength after 24 hours was determined to be 200 in-lb. The stability of the adhesive was tested by filling a 250 ml round bottom plastic container halfway with the adhesive and aging the composition at 50C for ten days. The material was then tested for fingertight time via the above process and the fingertight time was ten minutes. A film of the aged composition was placed on a glass slide and tested as above and was determined to be tack free. Nuts and bolts were assembled with the adhesive and allowed to stand for 24 hours. After this time the average torque strength was determined to be 150 in-lb.

COMPARATIVE EXAMPLE

A sample adhesive composition having the ingredients set out in Table 2 was formed via a process different than that of the Example.

TABLE 2

Comparative Sample Adhesive Formulation

| Ingredient | Weight Percent |
|---|---|
| SR-9003 | 86.3 |
| SR-489 | 4.5 |
| EDTA(NH$_4$)$_2$ (5% in 1:1 vol/vol, methanol/water) | 1.5 |
| Naphthoquinone (5% solution in tetraethyleneglycol dimethacrylate) | 1.5 |
| Acrylic Acid (99%) | 1.9 |
| Saccharin | 0.2 |
| N,N-dimethyl-p-toluidine | 0.05 |
| UVITEX OB | 0.01 |
| LUCIRIN TPO | 1.0 |
| IRGACURE 184 | 5.0 |
| Cumene Hydroperoxide (70%) | 0.9 |
| Yellow dye | 0.05 |
| Blue dye | 0.05 |

The adhesive of this Comparative Example was manufactured by first charging the SR-9003, SR489 and EDTA (NH$_4$)$_2$ to a polyethylene lined vessel with a fiberglass stirrer blade. Mixing was done vigorously at room temperature for three hours. The remaining ingredients were then added one at a time in the order listed and mixed until all were dissolved. The adhesive was evaluated by the same method set out in Example 1 and the fingertight time was determined to be >2 hours. The stability testing was also performed via the same method set out in Example 1 and the adhesive manufactured by the process of the Comparative Example polymerized after aging for one day at 50C.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

I claim:

1. A novel process for preparing a storage stable anaerobic//ultraviolet/visible light dual cure adhesive composition comprising the steps of:

a) forming a homogeneous mixture comprising one or more polymerizable (meth)acrylate ester monomers, one or more oligomeric polymerizable (meth)acrylate monomers, optionally (meth)acrylic acid, optionally plasticizers or thickening agents or both, one or more chelating agents and at least an effective amount of an accelerator, an organic cyclic sulfimide and heating this mixture at an elevated temperature of 20C to 100C for a time sufficient to achieve acceptable chelation;

b) Adding a tertiary amine accelerator and continuing to heat the mixture at a temperature in the range of about 20C to about 100C for a time sufficient to provide the composition with the desired anaerobic curing properties and stability on heat aging;

c) adding one or more photoinitiators and optionally one or more of the group consisting of oxidants, dyes or fluorescent agents at room temperature.

2. The process of claim 1, wherein the polymerizable monomers are selected from the group comprising propoxylated(2) neopentyl glycol diacrylate, tridecyl acrylate, isocyanate-hydroxyacrylate, isocyanate-aminoacrylate reaction products that may be characterized as acrylate-terminated polyurethanes and polyureides or polyureas, the acrylate diesters of bisphenol-type compounds, monofunctional acrylate and methacrylate esters or the hydroxy-, amido-, cyano-, chloro-, and silane-substituted derivatives thereof, triethyleneglycol dimethacrylate, tetraethyleneglycol dimethacrylate, polyethyleneglycol dimethacrylate and hydroxyethyl methacrylate, and mixtures thereof.

3. The process of claim 1 wherein the sulfimide is o-benzoic sulfimide.

4. The process of claim 1, wherein the tertiary amine is an aromatic tertiary amine selected from the group consisting of N,N-diethyl-p-toluidine, N,N-dimethyl-o-toluidine, acetyl phenylhydrazine, N,N dimethylaniline, N,N diethylaniline, p-isopropyl-N,N-dimethylaniline, N,N-dimethyl-p-toluidine, 2,4-dimethyl-N,N-dimethylaniline, 3,5-dimethyl-N,N-dimethylaniline acid and mixtures thereof.

5. The process of claim 1, wherein the chelating agent is tetrasodium ethylenediaminetetraacetic acid or diammonium ethylenediaminetetraacetic acid.

6. The process of claim 1, wherein the photoinitiator is selected from the group consisting of 1-hydroxycyclohexyl phenyl ketone; the combination of the 1-hydroxy cyclohexyl phenyl ketone and benzophenone,2,2-dimethoxy-2-phenyl acetophenone; the combination of bis(2,6-dimethoxybenzoyl-2,4,4-trimethyl pentyl phosphine oxide and 2-hydroxy-2-methyl-1-phenyl-propan-1-one; 2-hydroxy-2-methyl-1-phenyl-1-propane; the combination or 2,4,6-trimethylbenzoyldiphenyl-phosphine oxide and 2-hydroxy 2-methyl-1-phenyl-propan-1-one; trimethylbenzoylphosphine oxides and mixtures thereof.

7. The process of claim 1, wherein the polymerizable (meth)acrylate ester monomer and oligomers are present in an amount 75 to 95% weight percent of the adhesive composition.

8. The process of claim 7, wherein the polymerizable (meth)acrylate ester monomers and oligomers are present in an amount 80 to 90 weight percent of the adhesive composition.

9. The process of claim 1, wherein the cyclic sulfimide accelerator is present in an amount of about 0.01 to about 12 weight percent of the adhesive composition.

10. The process of claim 1, wherein the tertiary amine is present in an amount of about 0.01 to about 3 weight percent of the adhesive composition.

11. The process of claim 1, wherein the chelating agent is present in an amount of about 0.001 to about 0.2 weight percent of the adhesive composition.

12. The process of claim 11, wherein the chelating agent is present in an amount of about 0.005 to about 0.1 weight percent of the adhesive composition.

13. The process of claim 1, wherein the one or more photoinitiators is present in an amount of about 0.5 to about 10 weight percent of the adhesive composition.

14. The process of claim 13, wherein the one or more photoinitiators is present in an amount of about 2 to about 8 weight percent of the adhesive composition.

15. The process of claim 1, wherein in step (b) the mixture is heated at a temperature in the range of about 20C to about 100C.

16. The process of claim 15, wherein in step (b) the mixture is heated at a temperature in the range of about 45C to about 70C.

17. The process of claim 1, wherein in step (b) the mixture is heated for a time in the range of about 4 hours to about 30 hours.

18. The process of claim 17, wherein the mixture is heated for a time in the range of about 10 to about 24 hours.

* * * * *